(12) United States Patent
Scriber

(10) Patent No.: US 11,222,319 B2
(45) Date of Patent: Jan. 11, 2022

(54) SYSTEMS AND METHODS FOR POST-HOC DEVICE REGISTRATION

(71) Applicant: CABLE TELEVISION LABORATORIES, INC, Louisville, CO (US)

(72) Inventor: Brian Alexander Scriber, Denver, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 780 days.

(21) Appl. No.: 15/784,845

(22) Filed: Oct. 16, 2017

(65) Prior Publication Data

US 2018/0109375 A1  Apr. 19, 2018

Related U.S. Application Data

(60) Provisional application No. 62/408,567, filed on Oct. 14, 2016.

(51) Int. Cl.

| | |
|---|---|
| *G06Q 20/10* | (2012.01) |
| *H04L 9/08* | (2006.01) |
| *H04L 29/06* | (2006.01) |
| *G06Q 30/04* | (2012.01) |
| *G06Q 20/38* | (2012.01) |
| *H04W 12/041* | (2021.01) |

(Continued)

(52) U.S. Cl.
CPC ....... *G06Q 20/102* (2013.01); *G06Q 20/3829* (2013.01); *G06Q 30/04* (2013.01); *H04L 9/06* (2013.01); *H04L 9/0825* (2013.01); *H04L 9/3268* (2013.01); *H04L 63/061* (2013.01); *H04W 12/041* (2021.01); *H04W 12/0433* (2021.01); *G06Q 2220/00* (2013.01); *H04L 63/062* (2013.01); *H04L 63/0823* (2013.01)

(58) Field of Classification Search
CPC ....... H04L 9/0825; H04L 9/06; H04L 9/3268; H04L 63/061; G06Q 20/102; G06Q 20/3829; G06Q 30/04
See application file for complete search history.

(56) References Cited

U.S. PATENT DOCUMENTS

| | | | |
|---|---|---|---|
| 2005/0154878 A1* | 7/2005 | Engberg | H04L 63/0823 713/157 |
| 2008/0069347 A1* | 3/2008 | Brown | H04L 9/3252 380/45 |

(Continued)

*Primary Examiner* — Jay Huang
*Assistant Examiner* — Courtney P Jones
(74) *Attorney, Agent, or Firm* — Armstrong Teasdale LLP

(57) ABSTRACT

A method for managing a post-hoc device registration in an ecosystem is provided. The method includes assembling an electronic device, having a system on a chip (SoC) integrated therein. The method further includes activating/onboarding the device, receiving, by a CA from the device, a communication containing at least one keypair, validating, from the CA to the device, the at least one keypair, triggering, by the CA, data capture of validation data. The validation data includes user registration data, and manufacture/status data for least one of the device and the SoC. The captured validation data is stored in a database of the CA, and then aggregated, along with the received at least one keypair, from the CA database into a billing invoice to the device assembler. The registration data is referenced to the at least one keypair and other validation data by the CA.

19 Claims, 3 Drawing Sheets

(51) Int. Cl.
*H04W 12/0433* (2021.01)
*H04L 9/06* (2006.01)
*H04L 9/32* (2006.01)

(56) References Cited

U.S. PATENT DOCUMENTS

| | | | | |
|---|---|---|---|---|
| 2014/0044265 | A1* | 2/2014 | Kocher | H04L 9/3247 |
| | | | | 380/277 |
| 2015/0052351 | A1* | 2/2015 | Nodehi Fard Haghighi | ............... |
| | | | | H04L 63/0823 |
| | | | | 713/156 |
| 2015/0381368 | A1* | 12/2015 | Stevens, Jr. | H04L 63/126 |
| | | | | 705/40 |
| 2016/0134621 | A1* | 5/2016 | Palanigounder | H04L 9/3268 |
| | | | | 713/156 |
| 2017/0242674 | A1* | 8/2017 | Hussein | G06F 8/61 |
| 2017/0244562 | A1* | 8/2017 | He | H04L 9/30 |

\* cited by examiner

SYSTEMS AND METHODS FOR POST-HOC DEVICE REGISTRATION

CROSS REFERENCE TO RELATED APPLICATIONS

This application claims the benefit of and priority to U.S. Provisional Patent Application Ser. No. 62/408,567, filed Oct. 14, 2016, which is incorporated herein by reference in its entirety.

BACKGROUND

The field of the disclosure relates generally to management of device registration, and more particularly, to management of public and private keys and/or certificates through an ecosystems.

Many conventional electronic devices utilize a Public Key Infrastructure (PKI) to validate an electronic signature of the device in a variety of technology fields, such as telecommunications (e.g., mobile communication devices), the Internet of Things (IoT), online banking, secure email, and e-commerce. PKI uses a pair of cryptographic keys (e.g., one public and one private) to encrypt and decrypt data. PKI utilization enables, for example, devices to obtain and renew X.509 certificates, which are used to establish trust between devices and encrypt communications using such protocols as Transport Layer Security (TLS), etc. A PKI includes policies and procedures for encrypting public keys, as well as the creation, management, distribution, usage, storage, and revocation of digital certificates. The PKI binds the public keys to the identity of a person or legal entity, typically through a trusted Certificate Authority (CA). The PKI hierarchy identifies a chain of trust for a device or program, and further may provide secure software download requirements for the devices, and/or secure certificate injection requirements on the device manufacturers. The CA, the electronic devices, the device manufacturers, and users of the device interact over a PKI ecosystem.

In conventional PKI ecosystems, however the management of keys, as well as the process of inserting keys into the devices, is problematic, expensive, and difficult to audit. Due to these difficulties, device manufacturers that utilize PKI are today required to add PKI costs to the bill of materials of each device at the time of manufacture, irrespective of whether the device may be eventually sold to/activated by a consumer. The security benefits provided to the device are considered to outweigh the risk of purchasing a PKI keypair that might not be sold. The PKI security is required to meet compliance guidelines, by regulatory bodies in industry, for the particular ecosystem requirements, for market purposes. Nevertheless, the risk of not recouping the PKI bill of materials investment, which is often compounded by the inability of the device manufacturers to charge a premium for the added security, has been an obstacle to the utilization of PKY by many industries.

Furthermore, many conventional IoT devices may be deployed in more than one existing ecosystem (e.g., Open Connectivity Foundation (OCF), AllSeen/AllJoyn, Nest/Thread, Zigbee, etc.), and a different key is inserted on such devices for each ecosystem into which deployment is desired. The manufacturers of such conventional devices must add to the PKI bill of materials the cost for each such inserted keypair, even if the device may never be activated in more than one (or any) of the corresponding ecosystems. Thus, some IoT devices are manufactured to be deployable only within particular ecosystems. Accordingly, it is desirable to have a PKI management system that enables device manufacturers to audit which inserted keypairs are actually being activated by a consumer, and to be invoiced only for registrations and/or certificates that have actually been issued by an ecosystem CA.

BRIEF SUMMARY

In an aspect, a method is provided for managing a post-hoc device registration in an ecosystem in which the device is deployed. The method includes a step of assembling an electronic device. The device has a system on a chip (SoC) integrated therein. The method further includes activating or onboarding the device, receiving, by a CA from the device, a communication containing at least one keypair, validating, from the CA to the device, the at least one keypair, triggering, by the CA, data capture of validation data, the validation data including user registration data, and data relevant to the manufacture and status of at least one of the device and the SoC, storing the captured validation data in a database of the CA, and aggregating the stored validation data, along with the received at least one keypair, from the CA database into a billing invoice to the device assembler. The registration data is referenced to the at least one keypair and other validation data by the CA.

In another aspect, an ecosystem for managing a public key infrastructure PKI is provided. The ecosystem includes a manufacturer system configured to integrate a system on a chip (SoC) into an electronic device, an assembled electronic device having at least one integrated SoC, and at least one PKI keypair encoded on the SoC, and a certificate authority CA server system in operable communication with a computer system of the manufacturer system and the assembled electronic device. The certificate authority server system is configured to (i) validate the at least one keypair, and (ii) store captured data related to one or more of device registration, device manufacture, device status, SoC status, and SoC registration.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
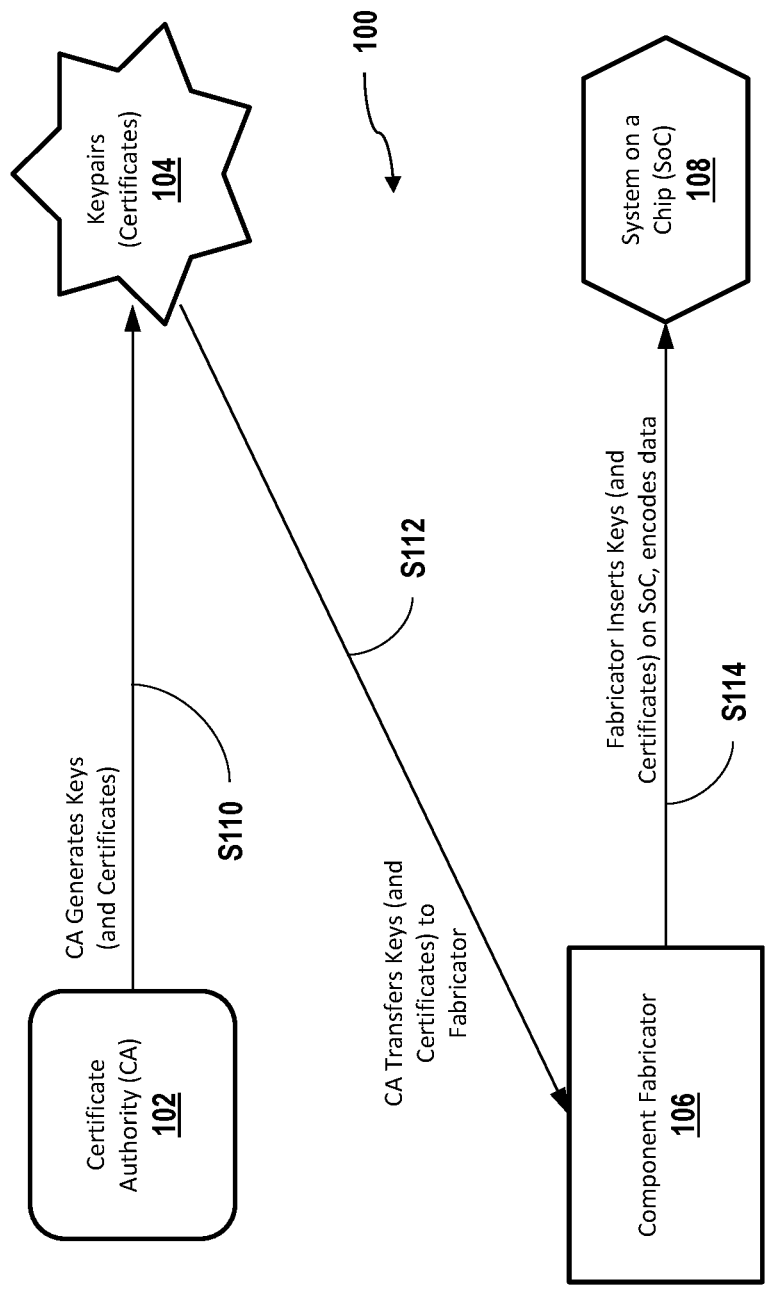
FIG. 1 is a schematic illustration of a keypair generation process, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used further herein, "CA" may refer to a certificate authority hosting a root certificate, and may further include, without limitation, one or more of a CA computer system, a CA server, a CA webpage, and a CA web service.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The embodiments described herein provide systems and methods for modifying a PKI validation process to also verify the status of a device during device registration validation of certificate chains. In an exemplary embodiment, a device is monitored as it transitions, during registration, from a "not in use" or "invalid" state to a state where the device is both "in use" and "valid." An appropriately manufactured device may be, for example, "valid," but not "in use" (e.g., activated by a consumer) prior to sale from the manufacturer to the consumer. According to these advantageous techniques, registration, billing, and ecosystem selection may be more reliably performed for a PKI device after the device has been purchased. That is, the present systems and methods implement a verifiable post-hoc decision process, which significantly improves over conventional manufacturing processes, which require a priori guesswork.

In an exemplary embodiment, the present systems and methods utilize an X.509 trust model, in which a trusted third party CA is responsible for signing digital certificates. Accordingly, as described herein, the CA is presumed to have capability to store one or more trusted root certificates (or intermediate certificates) as well as the corresponding private keys. The CA is further responsible for maintaining up-to-date revocation information regarding the validity of issued certificates, and will provide information to the other parties, for example, through an Online Certificate Status Protocol (OCSP). In some embodiments, the CA may provide information according to a Certificate Revocation List (CRL). The OCSP is an Internet protocol for obtaining a revocation status of an X.509 digital certificate, and is generally considered an alternative to the CRL. OCSP messages may be communicated, for example, by Abstract Syntax Notation One (ASN.1) encoding over the Hypertext Transfer Protocol (HTTP), from and to OCSP responders of the CA server (or OCSP server).

In exemplary operation, the CA issues PKI certificates and public keys to the ecosystem members. The CA receives OCSP request messages from the ecosystem members and confirms the revocation status of a corresponding certificate (e.g., stored in the trusted database of the CA), and the OCSP responder of the CA transmits an OCSP response message indicating the revocation status (e.g., "valid," "revoked," "unknown," etc., or an error message if the request message may not be processed). The present systems and methods improve upon conventional CA operation by providing a data capture trigger capability or mechanism to the OCSP responder, and an aggregation capability/mechanism to the database. In some embodiments, these additional elements are further coupled with a Customer Relationship Management (CRM) unit of the CA.

In the exemplary embodiment, the CA generates or records the issuance of the public/private keypairs. In some embodiments, the CA further optionally generates/records the certificates associated with the keypairs. Whereas, in conventional systems, the CA charges a device manufacturer up-front for the keypair issuance operation, in the exemplary embodiment such up-front payments are advantageously adjustable to a particular arrangement between, for example, the device manufacturer and the CA. That is, up-front charges/payments may be, at the time of key creation, full, partial, or none. In some embodiments, the created keys constitute a single keypair. In other embodiments, the created keys are multiple keypairs for different ecosystems.

In the exemplary embodiment, the keypair(s), as well as the optional certificates, is(are) to inserted or generated on a System on a Chip (SoC) prior to any secondary inclusion of the SoC into a manufactured device, that is, at the time of SoC manufacture. For example, a device manufacturer or integrator may purchase a previously-manufactured SoC, and integrate the secure element thereof (e.g., along with the associated credentials) in the final design of the finished device. Subsequently, when the device is purchased (e.g., by a consumer), its packaging removed, and installed within an ecosystem network, the PKI protocol for the device will validate the keys and, optionally, the associated certificate(s).

In exemplary operation, during the validation process of the PKI protocol, a specially-formatted message is transmitted to the OCSP responder. The OCSP responder may then trigger, at the time of device registration, an entry in a certificate database of the CA to capture particular status information of the device, including without limitation, data for the date/time of registration, a serial number device, the device batch number, SoC batch numbers, and SoC manufacturing date. In some operations, this data capturing mechanism may further trigger, during the registration process, the capture of consumer/user information, such as name, address, contact information, etc. In an exemplary embodiment, this additional captured data is aggregated and entered into a table of the CA database. In some embodiments, and aggregation mechanism further registers whether the device activation has met a predetermined threshold for minimum number of device registrations. The collected activation data may then be further aggregated into a billing system (e.g., the CRM) so that an invoice may be created to transmit to the device manufacturer for payment of the actual number of device activations/registrations.

FIG. 1 is a schematic illustration of a keypair generation process 100. Process 100 is implemented with respect to a CA 102, which generates one or more keypairs 104 for transfer to a component fabricator 106 for insertion/installation on an SoC 108. In exemplary operation, process 100 begins at step S110, in which CA 102 generates one or more keypairs 104. In at least one example of step S110, CA 102 further generates corresponding certificates (e.g., X.509 certificates) associated with generated keypair(s) 104. In step S112, CA 102 transfers keypair(s) 104 to component fabricator 106. In step S114, component fabricator 106 inserts keypair(s) 104 into SoC 108. In at least one example of step S114, along with the insertion of keypair(s) 104, SoC 108 further includes encoded identification data particular to SoC 108, including one or more of the batch numbers, the manufacturing date, and identifying information for component fabricator 106. In a further example of step S114, SoC 108 further includes encoded status data, e.g., "inactive," "integrated," "activated," "recycled," etc.

Figure 2:
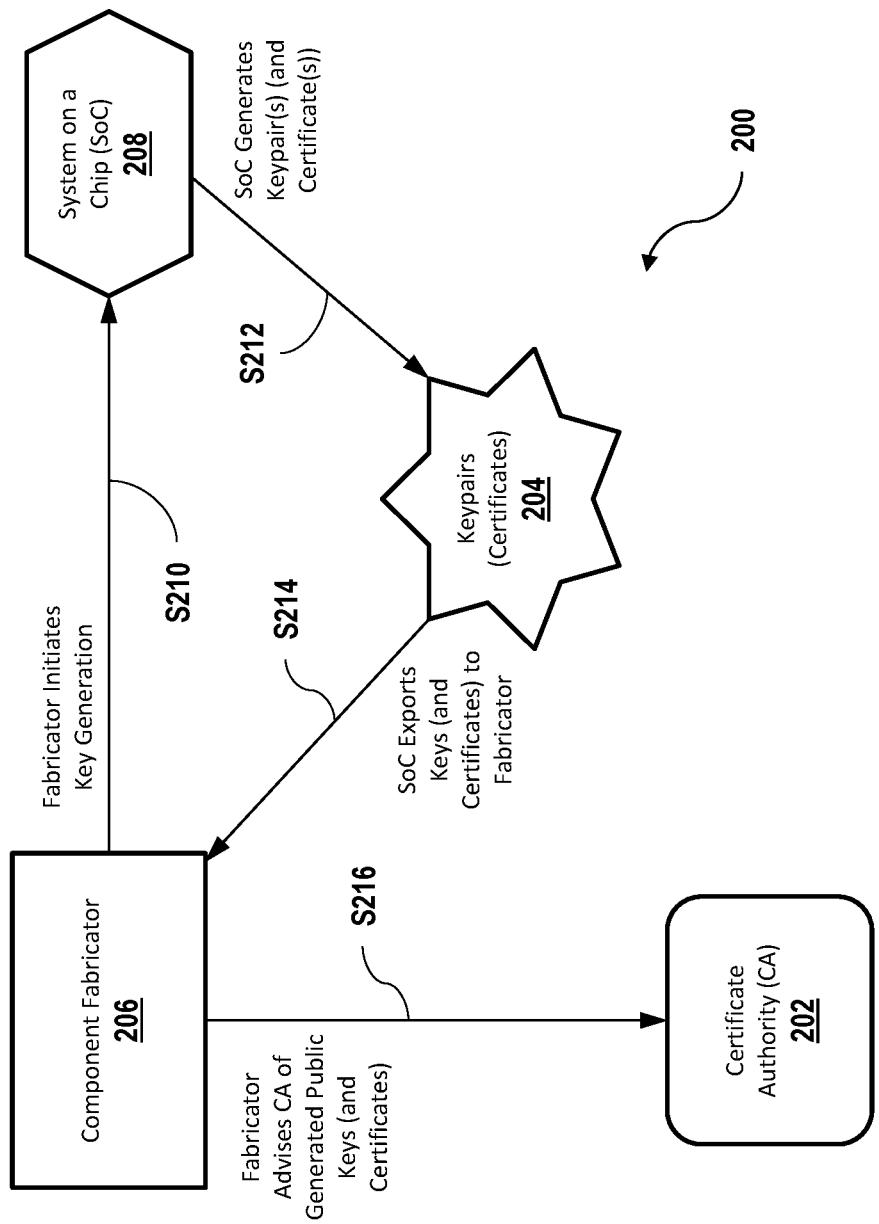
FIG. 2 is a schematic illustration of a keypair generation process, according to an alternative embodiment.

FIG. 2 is a schematic illustration of a keypair generation process 200. Process 200 is similar to process 100, FIG. 1, in that process 200 is implemented with respect to a CA 202, which generates one or more keypairs 204 for transfer to a component fabricator 206 for insertion/installation on an SoC 208. Process 200 differs though, from process 100, in that keypair(s) 204 in process 200 are generated by SoC 208, whereas in process 100, keypair(s) 104 are generated by CA 102.

In exemplary operation, process 200 begins at step S210, in which component fabricator 206 initiates key generation onto SoC 208. In at least one example of step S210, component fabricator 206 further initiates the generation of certificates that may also be encoded onto SoC 208. In step S212, SoC 208 generates one or more keypairs 204, as well as the optional certificates. In step S214, SoC 208 exports generated keypair(s) 204 and optional certificates to a computer system (not shown) of component fabricator 206 for recording into a memory thereof (also not shown). In at least one example of step S214, along with the exported keypair(s) 204 and certificates, the computer system memory of component fabricator 206 further includes manufacturing identification data relevant to SoC 208, including one or more of the batch numbers, the manufacturing date, as well as SoC status data. In step S216, component fabricator 206 advises CA 202 of any public keys (and optional certificates) for the keypair(s) 204 generated by SoC 208. In at least one example of step S216, along with the public keys and certificates, component fabricator 206 further communicates to CA 202 SoC status data, and optionally identifying information of component fabricator 206 (e.g., a digitally signed hash, etc.).

Figure 3:
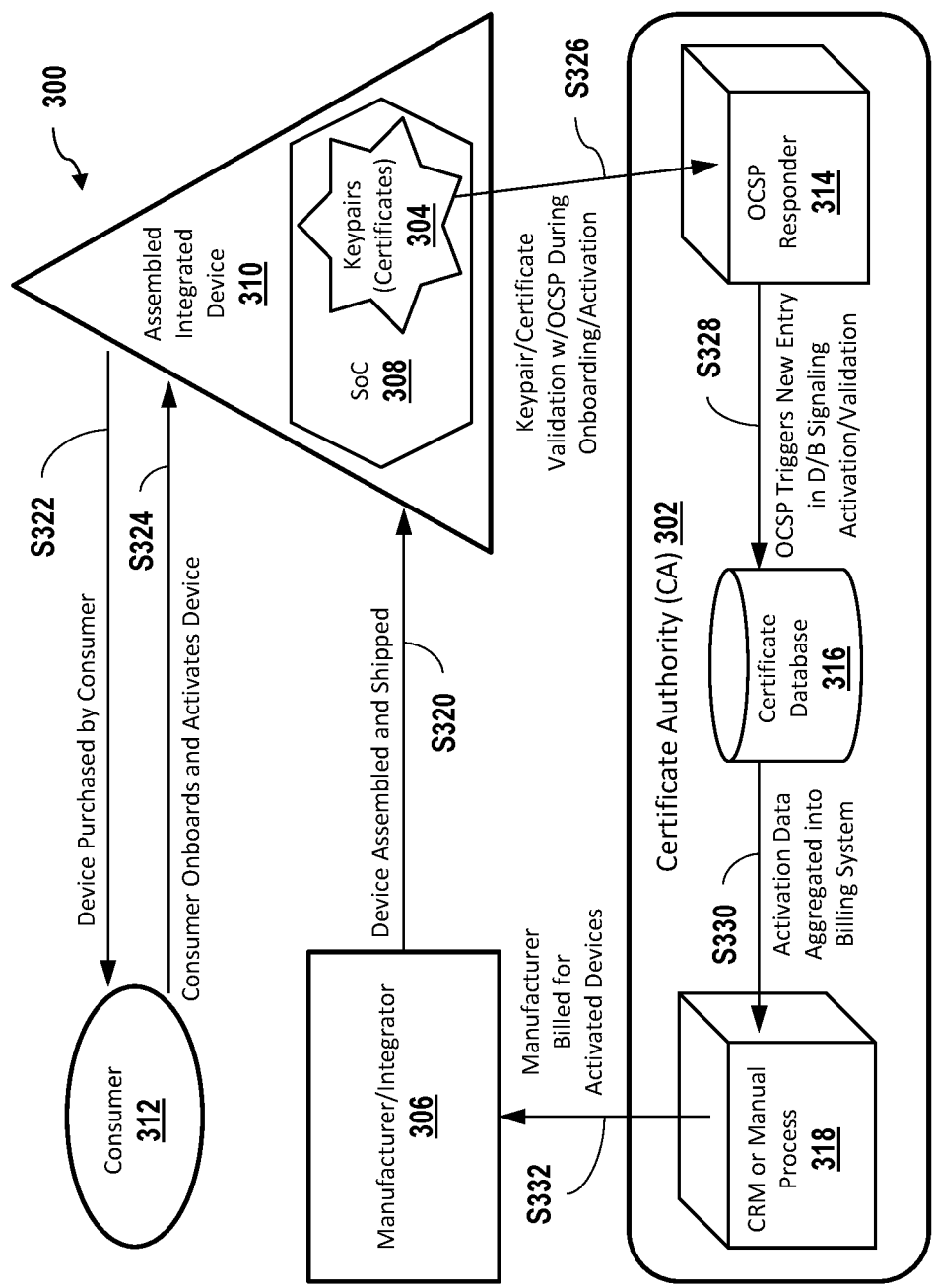
FIG. 3 is a schematic illustration of registration ecosystem for implementing the embodiments depicted in FIGS. 1 and 2.

FIG. 3 is a schematic illustration of registration ecosystem 300 for implementing process 100, FIG. 1 and/or process 200, FIG. 2. In the exemplary embodiment, ecosystem 300 includes elements common to processes 100 and 200, such as a CA 302, one or more generated keypairs 304 for transfer to a device manufacturer or integrator 306, and an SoC 308. In the exemplary embodiment, device manufacturer 306 is the fabricator of SoC 308. Alternatively, device manufacturer 306 functions to integrate SoC 308 as a previously-manufactured component from a separate component fabricator, and CA 302 is advised of generated public keys/certificates by either of the separate component fabricator (e.g., component fabricators 106, 206) and manufacturer 306. In the exemplary embodiment, ecosystem 300 further includes an electronic device 310, into which SoC 308 is assembled and/or integrated, and a consumer 312. Also in the exemplary embodiment, CA 302 includes one or more of an OCSP responder 314, a certificate database 316, and a CRM 318.

In exemplary operation of ecosystem 300, an exemplary PKI activation and validation process begins at step S320. In step S320, manufacturer 306 assembles device 310, including SoC 308 having one or more keypairs 304/certificates inserted into SoC 308 according to process 100 or process 200. In at least one example of process 300, step S320 includes a substep in which manufacturer 306 ships device 310 to a merchant, retailer, or distributor (not shown) from which device 310 may be obtained and/or purchased by consumer 312. In step S322, device 310 is obtained/purchased by consumer 312, and in step S324, the consumer activates and/or onboards device 310. In some examples of step S324, consumer 312 activates/onboards device 310 directly through device 310. In other examples of step S324, activation/onboarding is performed through a graphical user interface (not shown) of a computing device (e.g., personal computer, tablet, smart phone, etc.—also not shown) associated with consumer 312.

In step S326, validation of one or more keypairs 304 (and certificates) is performed with CA 302. In the exemplary embodiment, the keypair/certificate validation of step S326 is performed during the activation/onboarding subprocess performed in step S324. In one example of step S326, an OCSP request message from device 310/SoC 308 to OCSP responder 314 is transmitted during the keypair/certificate validation. In another example of step S326, a specially formatted call is made to OCSP responder 314 during the keypair/certificate validation.

In step S328, OCSP responder 314 triggers a data capture mechanism of CA 302 to (i) capture registration data related to the activation/onboarding of device 310, the device manufacturing identification/status data, and the SoC/status data, and (ii) record the captured data into certificate database 316. In the exemplary embodiment, the registration data includes the date/time of registration and optionally user information, including without limitation, the name, address, email, phone number, or other contact information associated with consumer 312 (or another appropriate user). Also in the exemplary embodiment, the manufacturing identification data of device 310 may include, without limitation, the device serial number, the device batch number, the date of assembly, and/or other information identifying manufacturer 306, and the device status data may include encoded data reflecting the status of device 310, such as "onboard," "ready for use," "in use," "associated" (e.g., with consumer 312), "disassociated," "recycled/reprovisioned," "expired," etc. For example, some electronic devices 310 may be preliminarily provisioned or onboarded by manufacturer 306, but not yet associated with or activated by consumer 312. The present embodiments thus advantageously enable manufacturers to render devices into such interim or partial status conditions without incurring PKI costs until devices are fully activated by consumers.

In the exemplary embodiment, the data capture mechanism represents a modification to OCSP responder 314 that renders additional capability thereto. In one example of ecosystem 300, new and unique coding is provided inside OCSP responder 314 to enable the additional data capture and/or aggregation capabilities, without separate modifications to the protocol. In an alternative embodiment, the data capture mechanism is a separate hardware unit or software coding/subroutine within CA 302 that is in operable communication with OCSP responder 314 and certificate database 316, or the respective coding therein. Certificate database 316 may represent a single memory or storage unit, or may be a plurality of storage databases managed and/or cross-referenced by CA 302.

In step S330, the validation, activation, and registration data stored within certificate database 316 is aggregated into a billing system of CRM 318 by an aggregation mechanism thereof. In the exemplary embodiment, the aggregation mechanism represents a modification to CRM 318. In an alternative embodiment, the aggregation mechanism is a separate hardware unit or software subroutine/database within CA 302 that is in operable communication with certificate database 316 and CRM 318. In at least one example of step S330, the aggregation mechanism utilizes a table that securely associates respective public keys, digital signatures, certificate revocation statuses, registration data, validation data, and/or activation data together for appropriate invoicing by CRM 318. According to this advantageous configuration, a novel coupling of the OCSP to the backend processes is achieved. In the exemplary embodiment, new coding within OCSP responder 314 is provided to create a backchannel to CRM 318.

In step S332, CRM 318 automatically assembles an invoice for transmission to manufacturer 306 for the individual devices 310 that have been activated by respective consumers 312, with respect to ecosystem 300, during an invoice period. In at least one example of step S332, certificate authority 302 manages more than one PKI, and the assembled invoice includes billing information for activations of particular devices 310 with respect to more than one PKI ecosystem managed by CA 302. In some embodiments, CRM 318 and/or the invoice assembled in step S332 include manual processing. The assembled invoice may be transmitted to manufacturer 306 as a digital or paper billing invoice, or may represent an automated virtual online financial transaction.

The exemplary systems and methods described and illustrated herein therefore significantly increase the commercial value of PKI implementation for technology industries and individual customers. As described herein, all desired credentials can be made available in (or generated by) the SoC that becomes part of the PKI-deployed device. Customers need not individually obtain credentials for each ecosystem in which the customer seeks to subsequently associate a purchased device. Additionally, the CA that issues and manages the certificates need not charge for the use of the certificates unless the device is later actually installed (i.e., presuming a purchase), and the PKI for the pre-inserted keys and/or certificates is validated according to these advantageous techniques, the bill of materials risk to the manufacturer/integrator is eliminated, or at least significantly attenuated (as well as the associated guesswork).

Accordingly, where manufacturers/integrators may be unwilling to purchase keys for every manufactured device under conventional schemes (irrespective of whether the device is actually purchased, or sits on a shelf in a warehouse), the same manufacturers/integrators would be willing to pay a PKI fee for only those devices which our actually used under the present systems and methods. Therefore, the present embodiments function to significantly reduce the cost of implementing PKI in a variety of technology industries, while also increasing the security of the number of integrated devices from this expanded PKI desirability. It is presently estimated, for example, that the number of IoT-connected devices is over 8 billion. The number of such deployed devices is expected to increase to over 20 billion within a few years, and to over 50 billion over the next decade. The cost savings and increased security resulting from the present embodiments is therefore considerably advantageous.

The present systems and methods also further allow a manufacturer to assemble or prepare a single device that is pre-configured (e.g., keys and certificates available on the SoC at the time of manufacture) to operate within multiple anticipated ecosystems, where each ecosystem has its own PKI. Under such configurations, the manufacturer would only expect to pay for the keys/certificates within the device that are related to the PKI in which the device is actually deployed. As described above, these novel techniques are of particular value to IoT device manufacturers who desire to have devices deployable within a variety of ecosystems, such as OCF, AllSeen/AllJoyn, Nest/Thread, Zigbee. Such devices are thus readily available for deployment in any of the anticipated ecosystems, but the manufacturer will only pay for those in which the device is actually deployed, thereby realizing significant savings in the overall manufacturing costs of such devices.

Exemplary embodiments of PKI management systems and methods are described above in detail, as well as particular embodiments relating to OCSP validation techniques that trigger post hoc device registrations with the PKI. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for managing a post-hoc device registration in a first public key infrastructure (PKI) ecosystem in which the device is deployed, the method comprising the steps of:
   assembling an electronic device having a system-on-a-chip (SoC) integrated therein, wherein the SoC includes a first keypair corresponding to the first PKI ecosystem and a second keypair corresponding to a second PKI ecosystem different from the first PKI ecosystem;
   sharing, with a certificate authority (CA) associated with the first and second PKI ecosystems, a first communication including the first and second keypairs;

activating or onboarding the electronic device for use within the first PKI ecosystem, wherein the step of activating includes a capture of user registration data;

receiving, at the CA from the activated electronic device the CA, a second communication containing the first keypair;

validating, from the CA to the device, the first keypair to create first validation data;

triggering, by the CA, data capture of the first validation data, the first validation data including the user registration data, and data relevant to the manufacture and status of at least one of the electronic device and the SoC;

storing the captured first validation data in a database of the CA; and aggregating the stored first validation data, along with the received first keypair, from the CA database, into a first billing invoice to the device assembler, wherein the first billing invoice does not include the second keypair or second validation data relating to the second keypair, and wherein the user registration data is referenced to the first keypair and ether the first validation data by the CA.

2. The method of claim 1, wherein the step of assembling comprises a substep of generating, from the CA, the first and second keypairs.

3. The method of claim 1, wherein the step of assembling comprises a substep of generating, from the SoC, the first and second keypairs.

4. The method of claim 1, wherein the step of validating occurs at the same time as activating/onboarding.

5. The method of claim 1, wherein the step of triggering is performed by an Online Certificate Status Protocol (OCSP) responder of the CA.

6. The method of claim 5, wherein the step of validating includes an OCSP request message received by the OCSP responder and an OCSP response message returned by the OCSP responder.

7. The method of claim 1, further comprising a step of assembling the first billing invoice from the CA to a manufacturer computer system associated with the manufacturer assembly system, based on the aggregated first validation data, wherein the step of assembling is performed by one or more of an automatic process and a manual process.

8. The method of claim 7, wherein the assembled billing invoice includes payment statements for only those electronic devices that were actually activated since a previous billing cycle or period.

9. The method of claim 1, wherein the step of validation is further performed with respect to the second keypair for the electronic device activated for use within the second PKI ecosystem, wherein the step of storing further includes storing captured second validation data for the second keypair in the CA database, and wherein the step of aggregating includes aggregating the stored first and second validation data, along with the received second keypair into a second billing invoice to the device assembler, whereby (i) validation of the second keypair and storing of the second validation data enables the electronic device to deploy within the second PKI ecosystem but not the first PKI ecosystem, and (ii) deployment of the electronic device within the second PKI ecosystem incurs a PKI activation cost to the device assembler on the second billing invoice with respect to the second PKI ecosystem but not an additional PKI activation cost with respect to the first PKI ecosystem.

10. A system for managing a public key infrastructure (PKI), comprising:
   a fabrication subsystem configured to fabricate a system-on-a-chip (SoC) having a plurality of PKI keypairs encoded therein including a first PKI keypair and a second PKI keypair;
   a manufacturer assembly subsystem configured to integrate the fabricated SoC into a manufactured electronic device including the fabricated SoC as in integrated SoC;
   an assembled electronic device including the integrated SoC and the plurality of PM keypairs encoded therein; and
   a certificate authority (CA) server subsystem in operable communication with a fabricator computer subsystem of the fabrication subsystem, a manufacturer computer subsystem of the manufacturer assembly subsystem, and the assembled electronic device, the CA server subsystem being configured to (i) validate the first PKI keypair upon activation of the assembled electronic device within a first PM ecosystem, and (ii) store first captured data related to the activation of the assembled electronic device within the first PKI ecosystem, the first captured data including one or more of a device registration, a device manufacture, a device status, an SoC status, and an SoC registration,
   wherein the first and second PKI keypairs represent at least two different PKI ecosystems, respectively, having two different PKIs, and
   wherein activation of the assembled electronic device within the first PKI ecosystem does not activate the assembled electronic device within the second PKI ecosystem.

11. The ecosystem system of claim 10, wherein one of the SoC and the CA is further configured to generate at least one digital certificate along with the first keypair.

12. The system of claim 10, wherein the SoC is configured to generate the first PKI keypair from the fabricated SoC.

13. The system of claim 10, wherein the CA is configured to generate the first PKI keypair for installation on, or encoding within, the fabricated SoC.

14. The system of claim 10, wherein the CA further comprises:
   an online certificate status provider (OCSP) configured to receive an OCSP request message from the assembled electronic device, wherein the OCSP request message includes at least one a public key of the first keypair encoded on the integrated SoC;
   a data capture unit configured to capture one or more of the encoded public key of the first PKI keypair from the integrated SoC, customer registration information, device manufacture and device status data, fabricated and integrated SoC manufacturing data, and integrated SoC status data;
   a certificate database configured to store captured data for one or more of the plurality of PKI keypairs, certificates, customer registration information, fabricated and/or integrated SoC manufacture and status, and device manufacture and status;
   an aggregation unit for aggregating the stored captured data from the certificate database into a billing statement; and
   a customer relations management unit configured to receive the aggregated statement and generate therefrom an invoice to a particular manufacturer computer subsystem reflecting only the PKI-enabled devices, made by the manufacturer assembly subsystem associated with the particular manufacturer computer subsystem, that were activated within an activation time period for use within a particular PKI ecosystem associated with the first PKI keypair.

15. The system of claim 10, wherein the data capture mechanism is one of a part of the OCSP responder and a separate unit within the CA.

16. The system of claim 10, wherein the aggregation mechanism is one of (i) a part of a Customer Relationship Management (CRM) unit within the CA, and (ii) a separate unit within the CA.

17. The system of claim 10, wherein the OCSP triggers the data capture mechanism upon receiving an OCSP request message.

18. The system of claim 10, wherein OCSP is further configured to not transmit to the assembled electronic device (i) a first OCSP reply message until after the validation and registration of the assembled electronic device for use within the first PKI ecosystem associated with the first PKI keypair, including a status of the assembled electronic device, has been confirmed by the OCSP, or (ii) a second OCSP reply message until after a separate validation and registration of the assembled electronic device for use within the second PKI ecosystem associated with the second PKI keypair.

19. The system of claim 10, wherein the CA server subsystem is further configured to (i) validate the second PKI keypair upon activation of the assembled electronic device within the second PKI ecosystem, and (ii) store second captured data related to the activation of the assembled electronic device within the second PKI ecosystem separate from the assembled electronic device being activated in the first PKI ecosystem, wherein the second captured data includes one or more of a device registration, a device manufacture, a device status, an SoC status, and an SoC registration.

* * * * *